United States Patent [19]
McKee

[11] 3,931,559
[45] Jan. 6, 1976

[54] MALFUNCTION DETECTOR CIRCUIT FOR THE USE WITH A PUMP-OFF CONTROL CIRCUIT

[75] Inventor: Fount E. McKee, Houston, Tex.

[73] Assignee: Delta-X Corporation, Houston, Tex.

[22] Filed: Aug. 2, 1974

[21] Appl. No.: 494,140

[52] U.S. Cl............................. 318/455; 307/125
[51] Int. Cl.² ........................................ H02H 7/08
[58] Field of Search .......... 307/125, 141, 232, 234; 318/455, 454, 474; 317/9 R, 9 AC; 340/292, 253 R, 253 A, 253 B, 253 C, 253 E, 253 H, 253 N, 253 P, 253 Q, 253 S, 253 W, 253 Y, 253 Z, 419, 239 R

[56] References Cited
UNITED STATES PATENTS

| | | | |
|---|---|---|---|
| 3,200,392 | 8/1965 | Chumakov | 340/253 E |
| 3,417,290 | 12/1968 | Craddock | 318/454 X |
| 3,509,824 | 5/1970 | Schmidly | 318/474 X |
| 3,763,397 | 10/1973 | Yockers | 317/9 R |

Primary Examiner—Robert K. Schaefer
Assistant Examiner—M. Ginsburg
Attorney, Agent, or Firm—Fulbright & Jaworski

[57] ABSTRACT

A malfunction detector circuit for use in conjunction with a pump-off control circuit which is periodically actuated by a timer and which monitors the current drawn by the drive motor of a liquid well pump. The malfunction circuit monitors the operation of the timer, pump-off control circuit, and drive motor of the well pump for detecting any abnormalities in operation and provides a signal if a malfunction occurs. The malfunction circuit is actuated by the pump-off circuit timer unless the pump-off circuit gains control of the driver motor and interlocks the malfunction output. A counter is provided to count a predetermined number of sequential failures before a malfunction is indicated. In addition, an excessive current measuring circuit detects malfunctions such as parted rods, split tubings, stuck valves and other abnormal situations.

7 Claims, 2 Drawing Figures

MALFUNCTION DETECTOR CIRCUIT FOR THE USE WITH A PUMP-OFF CONTROL CIRCUIT

BACKGROUND OF THE INVENTION

Generally, various control circuits known as pump-off control circuits have been proposed, such as in my copending patent applications Ser. No. 331,804, filed Feb. 12, 1973 and Ser. No. 437,833, filed Jan. 30, 1974 to shut off the power to the pump drive motor when the supply of liquid in the well has been pumped dry to prevent damage to the equipment and the use of unnecessary power. Generally, such pump-off control circuits are initially actuated by a timer at periodic intervals, after which the control circuit is initiated, to control the power to the pump drive motor and shut off the power when the well has been pumped dry. The pump-off control circuit senses either the current or power drawn by the pumping unit and utilizes the fact that the power required by the pump drive motor is less when no liquid is being produced from the well than when liquid is being produced to turn off the pump drive motor.

The present invention is directed to a malfunction detector circuit which is used in conjunction with any suitable pump-off control circuit for example such as described in the foregoing applications, for providing an indication as to whether the pump-off control circuit is operating satisfactorily, and whether or not there are other abnormal conditions in the well which should be noted. The present malfunction detector monitors the current drawn by the drive motor and detects such malfunctions as parted rods, split tubing, worn pumps, stuck traveling valves or standing valves and other abnormal situations.

SUMMARY

The present invention is directed to a malfunction detector circuit for use in combination with a pump-off control circuit which is periodically actuated by a timer and which monitors the current drawn by the drive motor of a well pump. Since the oil well pump is generally at remote locations, it is desirable to provide an indication that s malfunction has occurred or to shut down the pumping unit completely, if desired. The present malfunction circuit monitors various abnormal situations which may occur in the operation of an oil well pumping unit.

One of the features of the present invention is the provision of a malfunction detector circuit used in combination with a pump-off control circuit which senses if the control circuit gains control of the pump motor which indicates that the well is pumping fluid. Furthermore, the detector circuit can be set to count a desired number of sequential failures of the pump-off control circuit to gain control of the pump motor, and only provide an indication of malfunction after a predetermined number of failures.

Another object of the present invention is a malfunction detector circuit which monitors the electrical current to the drive motor for detecting malfunctions which would cause the motor to draw excessive current. The malfunction detector circuit of the present invention is valuable in detecting such malfunctions as parted rods, split tubing, worn pumps, stuck traveling valves or standing valves, and other abnormal situations.

A still further object of the invention is the provision of a logic circuit for receiving a signal from the timer, a signal from the pump-off control circuit indicating its operation, and a signal from the current monitoring transformer and which will detect and report any of several malfunctions occurring at the pumping unit.

Other and further objects, features and advantages will be apparent from the following description of the presently preferred embodiment of the invention, given for the purpose of disclosure and taken in conjunction with the accompanying drawings.

DESCRIPTION OF THE PREFERRED EMBODIMENT

While the malfunction detector circuit of the present invention can be used with various types of pump-off control circuits, for purposes of illustration only, the present invention will be described in use with the pump-off control circuit disclosed in my copending patent application Ser. No. 437,833, filed Jan. 30, 1974.

Figure 1:
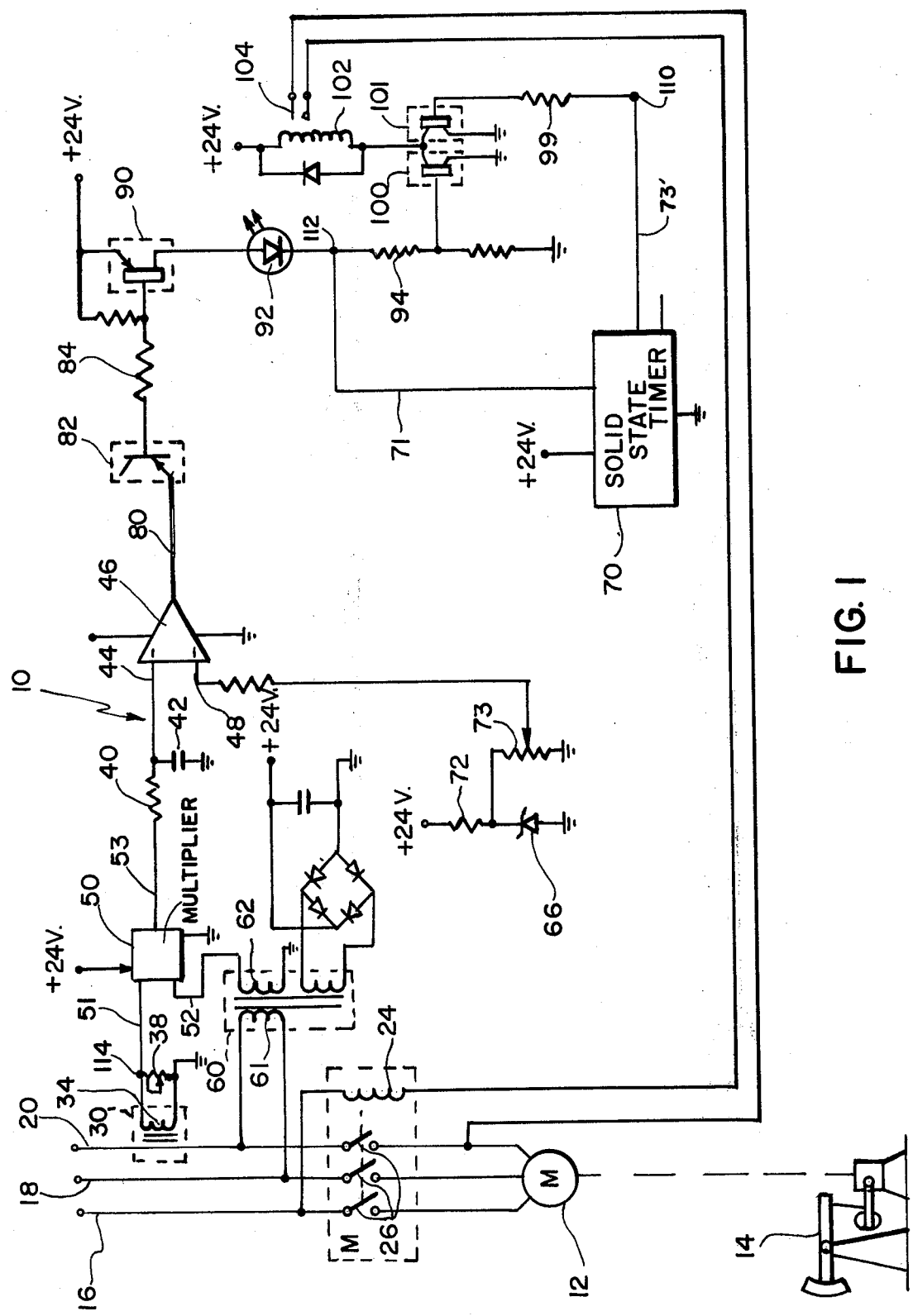
FIG. 1 is an electrical schematic of one form of a pump-off control circuit.

Referring now to the drawing, and particularly to FIG. 1, the reference numeral 10 generally indicates a pump-off control circuit for turning off the power to a drive motor 12 of a conventional oil well pumping unit 14. The electrical power supply to the motor 12 may include one or more electrical supply lines 16, 18 and 20. A conventional timer such as timer 70 which may be of the type shown in U.S. Pat. No. 3,509,824, is provided which turns the power on to the motor 12 after the unit has been turned off for a preset period of time. The timer 70 through its output connected to line 73' turns on power to the motor by supplying a current to transistor 101. This causes a relay 102 to close its contact 104 which supplies power to the motor contactor coil 24 for actuating the power contacts 26. The timer 70 will keep the power supplied to the pumping unit motor 12 for a predetermined time. During this time the control circuit 10 must determine if the well is pumping fluid or is in a pumped-off state. If the well is pumping fluid as desired, then the control circuit 10 will keep the relay 102 energized and maintain electrical power to the pumping motor 12.

A current transformer 30 is provided which senses the current drawn by the pumping motor 12 which is an indication of the load exerted by the pumping unit 14. A voltage transformer 60 is provided which measures the instantaneous voltage across one phase of the motor 12 supply voltage. The transformer 60 supplies the instantaneous output to an input 52 of a four quadrant multiplier 50 of a conventional type. The current transformer 30 supplies an AC voltage proportional to the current drawn by the motor 12 to a second input on line 51 of the four quadrant multiplier 50. The multiplier 50 produces an output on line 53 having an instantaneous value which is the product of the instantaneous values existing at the inputs on lines 51 and 52 of the multiplier 50 and thus is proportional to the instantaneous power supplied to the motor 12.

The output 53 from the multiplier 50 is fed through an RC network consisting of a resistor 40 and a capacitor 42. The time constant of the RC circuit is greater than the time required for the pump to complete one full pumping cycle so that the voltage across the capacitor approaches the average of the voltage at the output 53 of the multiplier 50. The voltage across the capacitor 42 accurately senses the average power drawn by the motor 12.

The voltage across the capacitor 42 is fed to the minus input on line 44 of a comparator 46. A stable reference voltage is fed to the plus input on line 48 of the comparator 46 and is obtained from a resistor 72, a resistor 73 and a temperature compensated zener diode 66. The reference voltage remains stable and can be compared with the input line 44 for determining when the average power to the motor 12 decreases below a preset level.

The output which is connected to line 80 of the comparator 46 is fed to a transistor 82 which is connected to act as a zener diode. When the input connected to line 44 of comparator 46 is more positive than input connected to line 48 of the comparator 46, then the output connected to line 80 of the comparator 46 will go low. When the output 80 goes low, transistor 82 will turn on transistor 90. Transistor 90 will conduct through diode 92 which is a light emitting diode and provides an indication that the control circuit 10 has gained control of the pumping motor 12. The current also turns on a transistor 100 keeping relay 102 energized which keeps contacts 104 closed to continue to supply power to the motor 12. At the same time, a signal is also supplied over line 71 to the timer 70 which causes the timer 70 to recognize that the control circuit 10 is in control of the power and the timer 70 will turn off and not be actuated until the control circuit 10 recognizes that the well is pumped off.

When the well is pumped off, transistor 100 will be turned off, relay 102 will be de-energized and contact 104 will open causing the power contactor 24 to be de-energized which removes electrical power from the pumping unit motor 12. The pumping unit will stay off for the preset time on the timer 70. At the end of the preset time, the timer 70 will supply current to transistor 101 and again energize relay 102 which in turn closes contact 104 which in turn causes the motor contactor 24 to close and apply power to the pumping unit motor 12. The control cycle is then repeated.

The above description of the pump-off control circuit is generally described in my copending patent application Ser. No. 437,833, filed Jan. 30, 1974.

Figure 2:
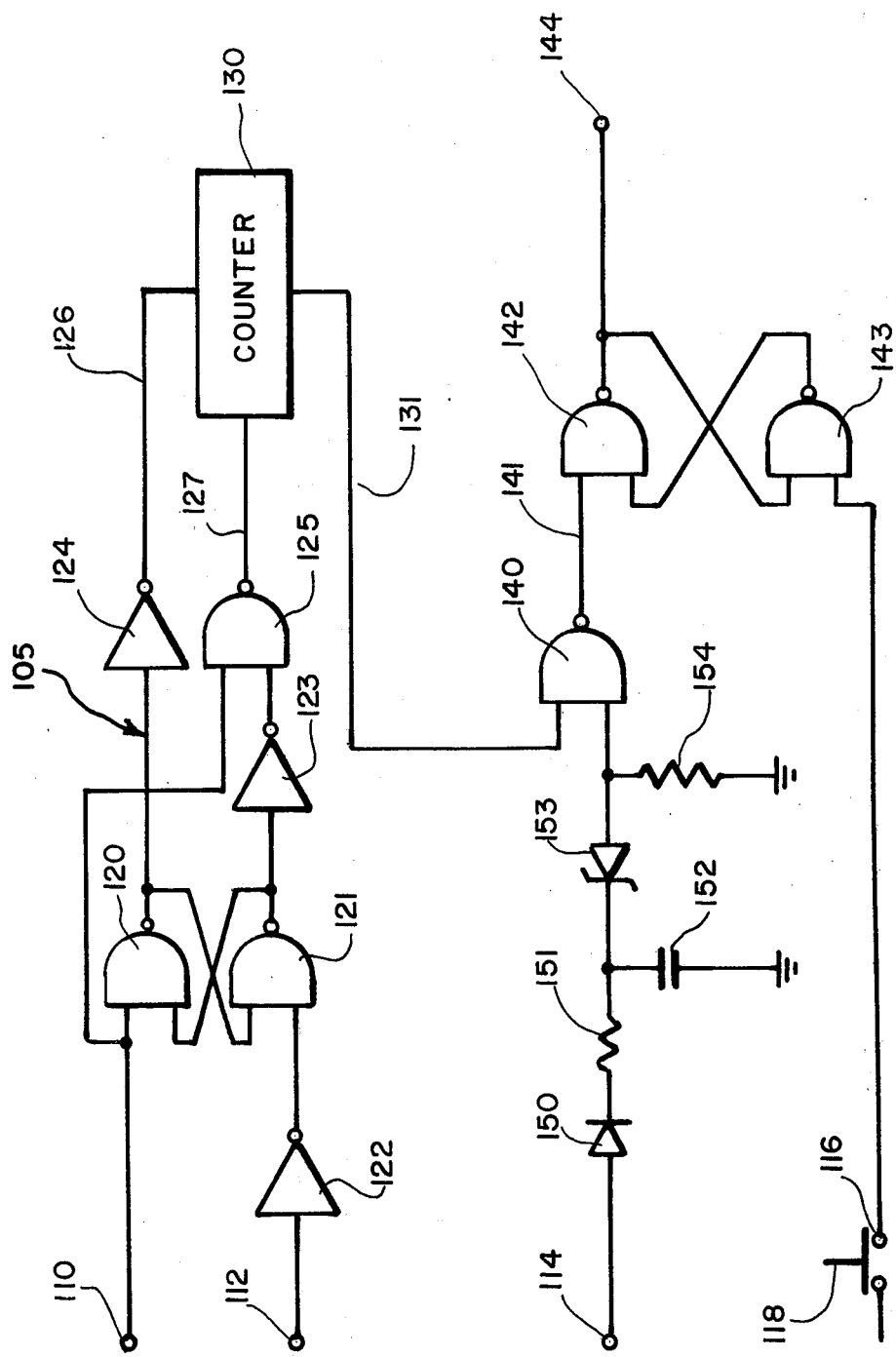
FIG. 2 is an electrical schematic of the malfunction circuit of the present invention.

Generally, the malfunction detector circuit, as best seen in FIG. 2, is generally indicated by the reference numeral 105 and may include four inputs. The input 110 is a timer signal receiving input which receives a signal from the timer 70 (FIG. 1) which indicates when the power is applied to the pumping unit motor 12 on startup. Input 112 is a control circuit signal input which receives a signal derived from the pump-off control circuit 10 which indicates when the pump-off control circuit has gained control of the drive motor 12. Input 114 is a current measuring circuit input and is derived from the current transformer 30 and is used to detect when the current exceeds a specific value above the normal. Input 116 is a reset input to which a signal is applied when the entire system is first turned on. Output line 144 provided with an output signal from the malfunction detector circuit 105 which indicates that a malfunction has occurred. This system will go high when the malfunction occurs and will remain high until it is reset by the application of signal to input 116 by switch 118. The output applied to line 144 can be used to shut down the pumping unit completely or just give an indication that a malfunction has occurred and lets the pumping unit continue to operate.

When the timer 70 in the pump-off circuit 10 turns the pumping unit 12 on, a signal is supplied from the timer 70 to the timer signal receiving input means 110. The signal is a low going signal and the timer signal receiving input means 110 may include interlocking means such as an R-S flip-flop comprised of NAND gates 120 and 121. The timer signal causes the R-S flip-flop to set such that the output of gate 120 is a high level. After the pumping unit 14 has been pumping for a short period of time, for example within three to five minutes, the pump-off control circuit 10 should gain control of the well and provide a signal to the control circuit signal input means 112 and to the input of inverter 12. The output of inverter 122 is fed into the input of gate 121 which resets the R-S flip-flop comprised of gates 120 and 121. Since this is the normal operation of the control circuit 10, nothing further occurs.

However, if the pump-off control circuit 10 fails to gain control within the specified minimum pumping time, then no signal will be present at the control circuit receiving means 112, and therefore the R-S flip-flop comprised of gates 120 and 121 will not be reset. This means that the output of gate 120 will remain high and the output of gate 121 will remain low. When the timer 70 has indicated that the minimum pump time has been completed, the timer will provide a high signal to the timer signal receiving input means 110. Therefore, with the signal at 110 high which is an input to a NAND gate 125 and with the output of gate 121 low which is being fed through an inverter 123 which produces a high output into the other input of gate 125. The output connected to line 127 of gate 125 will now be low. A low going output on line 127 of the gate 125 causes a counter 130 to advance one count. The counter 130 can be set to count the desired number of sequential failures of the pump-off control circuit 10 to gain control of the pump 14 and produce an output on line 131 which is an indication that a malfunction has occurred. Frequently it may be desirable to require that the pump-off control 10 try to gain control of the pump 14 for several successive times before indicating that a malfunction has occurred.

When the timer 70 has indicated that the down time has been completed and turns on the pumping unit 14 again a low signal will appear on the input 110 and cause the output on line 127 of the gate 125 to go high. If no control circuit signal has been received at input 112, to indicate that the pump-off control circuit 110 has gained control of the well, the R-S flip-flop comprised of gates 120 and 121 will not be reset and as a result when the input 110 goes low indicating that the minimum pump time has been completed, the output on line 127 of gate 125 will cause the counter 130 to advance one more count. In the event that the pump-off control circuit 10 does gain control of the well during the minimum pump time, a signal will be received at input 112 and will pass through inverter 122 and reset the R-S flip-flop 120 and 121. When the R-S flip-flop 120 and 121 is reset, the output of gate 120 goes low and this output is fed to an inverter 124 which has an output on line 126 that will be high. The high output on line 126 will reset the counter 130 to zero.

In the event the counter 130 reaches the desired number of counts, an output on line 131 will be generated. This output will be fed into one input of a NOR gate 140. The output on line 141 of the NOR gate 140 is fed into the input of gate 142. Gate 142 is one-half of an R-S flip-flop comprised of gates 142 and 143. When the output of gate 140 is fed into the input gate 142, the R-S flip-flop of gate 142 and 143 will change state and will produce a high output on line 144. The output on line 144 will remain high until a reset signal is received on input 116 by action of a reset button 118 to supply a signal at the input of gate 143.

The above description describes the operation of the malfunction detector circuit 105 when the pump-off control circuit fails to gain control of the well. However, other types of malfunctions exist which cause the motor to draw excessive current. One such malfunction is that the pumping rods part near the surface of the well. In that case, the motor will draw excessive current on the downstroke. Excessive current to the motor 12 is also an indication of other malfunctions. These malfunctions may be detected by receiving a current signal at input 114 of the excessive current measuring circuit. The current signal passes through a diode 150 and a resistor 151 and charges a capacitor 152. When the voltage across the capacitor 152 exceeds the breakdown voltage of a zener diode 153, a voltage equal to the difference between the zener breakdown voltage and the voltage across the capacitor 152 is developed across resistor 154. This differential voltage across resistor 154 is fed into the second input of the NOR gate 140 and to the R-S flip-flop comprised of gate 142 and 143 to again indicate a malfunction at the output on line 144. After a malfunction, the reset input 116 may be reset by pushbutton 118 to again place the malfunction detector circuit 105 back into operation. As previously mentioned, the output on line 144 may be used to completely shut down the pumping unit or merely give an indication that a malfunction has occurred.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made without departing from the spirit of the invention and the scope of the appended claims.

What is claimed is:

1. A malfunction detector circuit in combination with a pump-off control circuit which is periodically actuated by a timer and which monitors the average current drawn by the drive motor of a well pump and includes an output comprising, timer signal receiving means connected to and receiving a signal from the timer when the pump-off control circuit is actuated by the timer, output means connected to and actuated by the timer signal receiving means for indicating that a malfunction has occurred, control circuit signal receiving means connected to the output of the pump-off control circuit for monitoring when the control circuit is controlling the drive motor instead of the timer, interlocking means connected between the timer signal receiving means and the control circuit signal receiving means, said interlocking means actuated by the control circuit signal receiving means and controlling the output of the timer signal receiving means whereby the output means will only be actuated in the event the control circuit receiving means fails to receive a signal.

2. The combination of claim 1 including,
   an excessive current measuring circuit connected to and measuring the current drawn by the drive motor, and
   means connected between the current measuring circuit and the output means for actuating the output means when the current exceeds a predetermined amount.

3. The combination of claim 1 including,
   counting means connected between the output means and the timer signal receiving means, said counting means requiring a plurality of actuations by the timer signal receiving means prior to actuating said output means.

4. A malfunction detector circuit in combination with a pump-off control circuit which is periodically actuated by a timer and which monitors the average current drawn by the drive motor of a well pump and includes an output comprising,
   an R-S flip-flop including first and second NAND gates, the input of the first gate connected to the timer, the input of the second of the gates connected to the output of the pump-off control circuit,
   a third NAND gate having two inputs, the first input of which is connected to the timer, and the second input of which receives the output of the second gate,
   an inverter connected between the output of the second gate and the second input of the third NAND gate,
   a counter connected to the output of the third NAND gate, the output of the counter indicating a malfunction.

5. The combination of claim 4 including, an inverter connected between the counter and the output of the first NAND gate for resetting the counter.

6. The combination of claim 4 including,
   an excessive current measuring circuit measuring the current drawn by the drive motor, said current measuring circuit connected to the output of the counter to indicate an excessive current malfunction.

7. The combination of claim 4 including,
   a NOR gate having two inputs, the first input of which is connected to the output of the counter,
   an excessive current measuring circuit measuring the current drawn by the drive motor, said current measuring circuit connected to the second input of the NOR gate,
   a second R-S flip-flop including fourth and fifth NAND gates, the input of the fourth gate connected to the output of the NOR gate, and the output from the fourth gate being an indication of a malfunction, and
   a reset switch connected to the input of the fifth NAND gate.

* * * * *